United States Patent [19]

Jacobsen et al.

[11] 4,005,873
[45] Feb. 1, 1977

[54] PORTABLE CUTTING AND SEWING WORK STATION

[75] Inventors: Theodore H. Jacobsen, Rockaway Township, Morris County; Anthony J. Russo, Clifton, both of N.J.

[73] Assignee: F.P.M. Corporation, Paterson, N.J.

[22] Filed: Nov. 14, 1975

[21] Appl. No.: 631,897

[52] U.S. Cl. .................. 280/63; 296/1 R; 280/79.2

[51] Int. Cl.² .......................... B60P 3/10

[58] Field of Search ............ 280/63, 79.1, 79.2; 112/217.1, 258; 296/1 R, 23 R, 26

[56] References Cited

UNITED STATES PATENTS

| 447,440 | 3/1891 | Tuthill | 296/1 R |
| 885,586 | 4/1908 | Carroll | 280/63 |
| 1,320,554 | 11/1919 | Houser | 296/23 R |
| 1,871,828 | 8/1932 | Vorst | 296/1 R X |
| 2,569,589 | 10/1951 | Trissell | 242/86.52 X |
| 3,253,870 | 5/1966 | Stanton | 112/217.1 X |

*Primary Examiner*—Robert R. Song
*Assistant Examiner*—R. Schrecengost
*Attorney, Agent, or Firm*—Silverman and Jackson

[57] ABSTRACT

The present invention comprises a portable cutting and sewing work station in which a single axle trailer of the U-haul type is adapted in order to exhibit a plurality of cutting surfaces and equipment storage areas. Said surfaces and areas may be selectably unfolded from particular areas within the trailer in order to form the desired work station. The present structure includes a sewing machine and a seat adjacent thereto in which the trailer proper is utilized as the base or support of the mobile work station.

3 Claims, 3 Drawing Figures

PORTABLE CUTTING AND SEWING WORK STATION

BACKGROUND OF THE INVENTION

Prior art in this field consists essentially of various industrial work stations utilized in assembly line situations wherein the transfer of a sewing machine, or other sewing means, into or out of a particular segment of an assembly line is required.

To best knowledge of the inventors, the prior art does not disclose the existence of a sewing machine, or a sewing work station, in combination with a trailer of the type which may be towed by an ordinary car or pick-up truck.

The need for such a mobile sewing work station has been particularly long-felt in the marine area, especially as it relates to sailboats. As may be appreciated, it is a difficult matter to transport the sails of a ship (or, on occasion, the ship itself) to a remote location for purposes of repair. Rather, the process of mending a torn sail could be considerably simplified if the required sewing apparatus could be made sufficiently mobile as to be easily hauled to the repair site. Such is the intent of the present invention.

In addition to the above utility in the marine area, there are other applications in which it is highly advantageous to possess the capability of bringing the required sewing means to a site at which mending is to occur.

SUMMARY OF THE INVENTION

The present portable cutting and sewing work station comprises a sewing machine and associated work areas positioned in combination with and within a trailer, preferably of the U-haul type.

It is an object of the present invention to provide a mobile, portable cutting and sewing work station adaptable to use in a variety of "in the field" sewing and mending operations.

It is a further object of the present invention to provide a portable cutting and sewing work station capable of providing all essential sewing, cutting and mending functions as may otherwise have been provided at an in-house, manufacturer's installation.

DETAILED DESCRIPTION OF THE INVENTION

Figure 1:
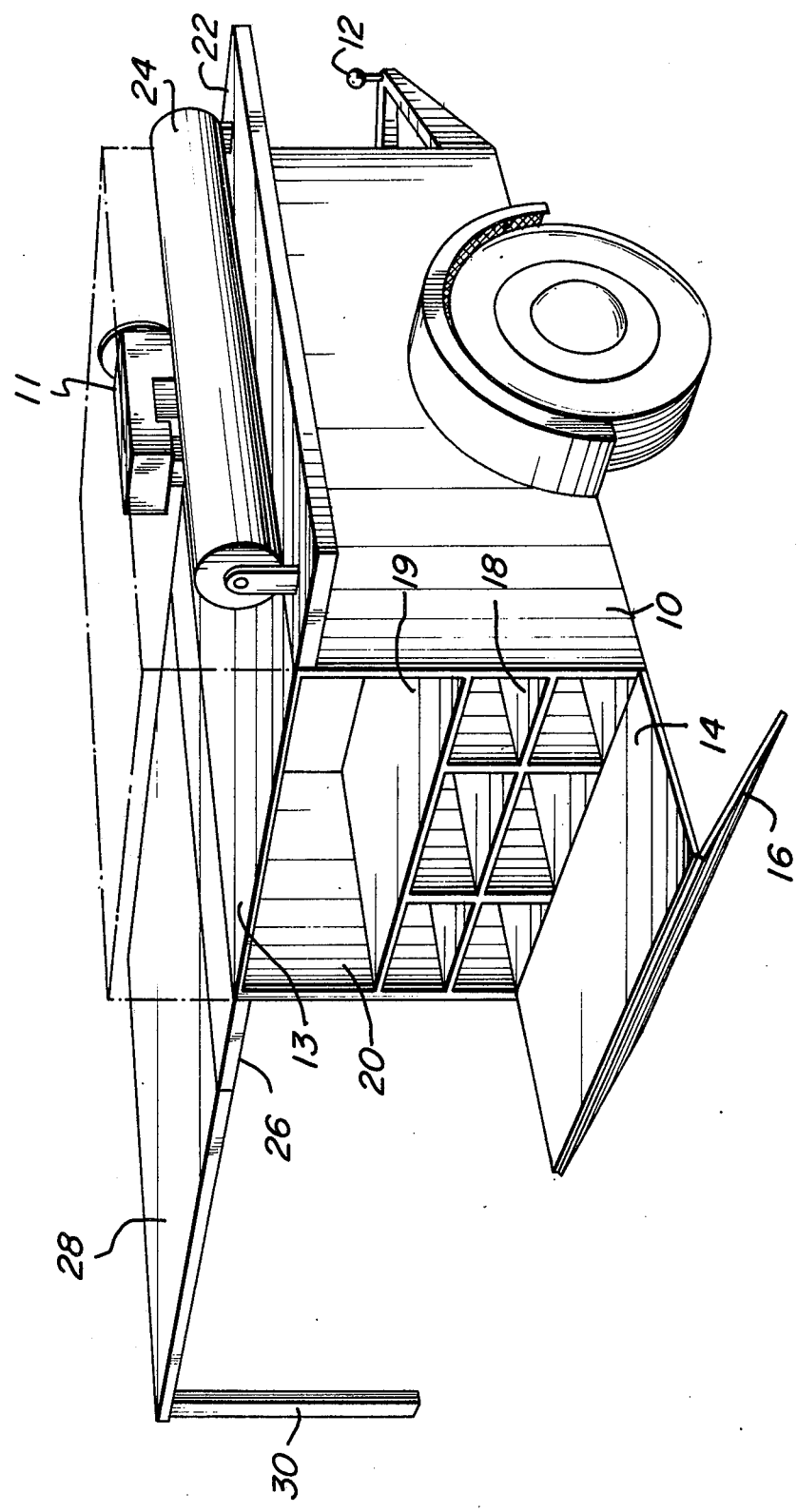
FIG. 1 is a perspective view of the present portable cutting station.

Shown in FIG. 1 is a perspective view of the present novel combination of a sewing apparatus, with its related work areas, and a trailer of the U-haul type.

Figure 2:
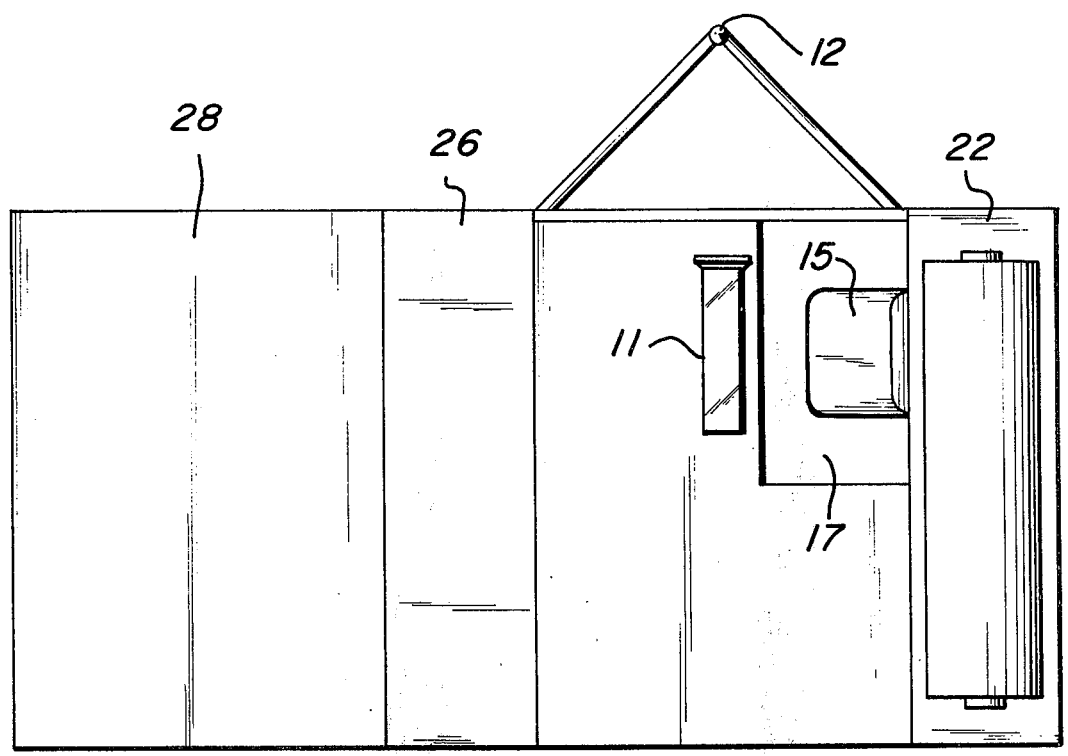
FIG. 2 is a top plan view of the present system.

It is noted that a sewing machine 11 is disposed along the longitudinal axis of a trailer 10 and towards the forward area thereof. See FIG. 2.

Figure 3:
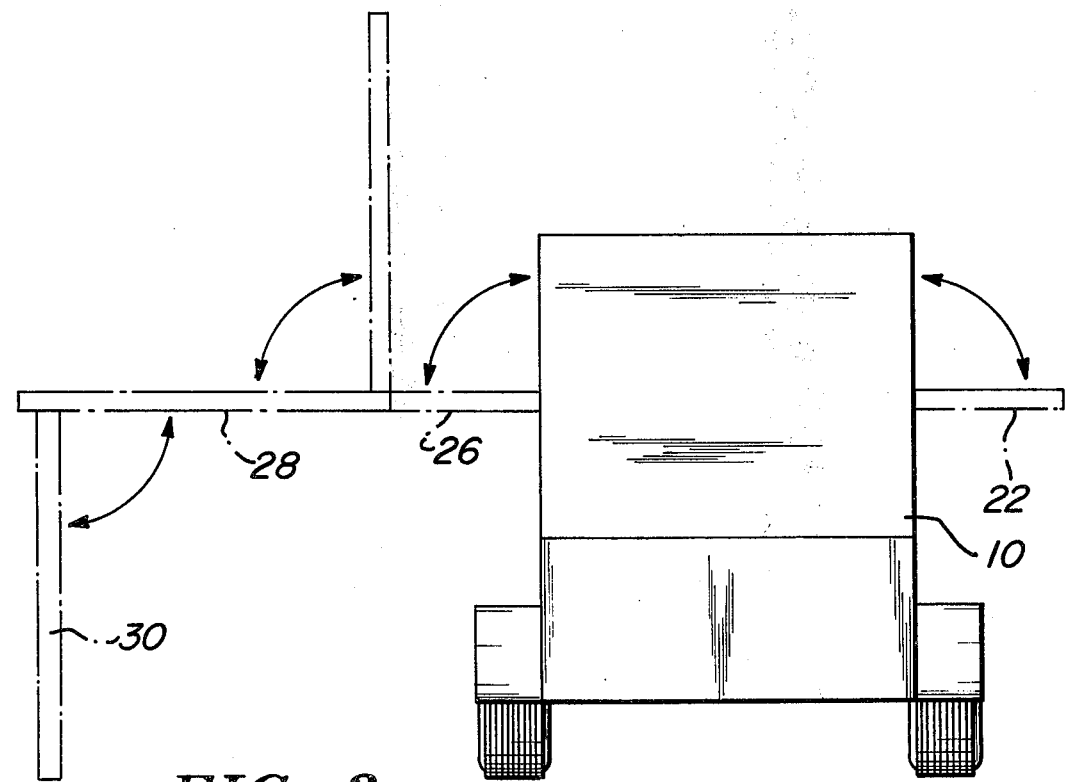
FIG. 3 is a rear schematic view of the present system showing the manner in which the various work panels are collapsibly folded into and out of the body of the trailer.

Disposed to the right of sewing machine 11 is a recessed seat 15 which is surrounded by a cloth disposal work area 17. It is noted that the recessed seat 15 is disposed within arm's length from the sewing machine 11 and that the back of said seat 15 comprises a part of one of the vertical walls of the trailer 10. In addition to the cloth disposal area 17, a variety of other work storage areas are provided through the present inventive system. More particularly, it may be seen that a rolled fabric storage platform 22 is placed behind the recessed seat 15 and that, further, upon said storage platform 22 is an elongated roll of fabric 24. As is shown in FIG. 3, the fabric storage platform 22 is collapsibly foldable into the trailer proper.

In addition to said platform 22, a number of other platform and work areas are provided. These include platform 28 which, as shown in FIG. 3, is collapsibly foldable into and out of the trailer 10 by virtue of side folding panel 26 and support leg 30 which, in a collapsed condition of said platform 28, is itself foldable onto the top of said trailer.

A further work area appears in the form of platform 14 which, in its unfolded condition, is supported by support leg 16 of platform 14.

Further, it is noted that a plurality of storage areas 18 and 19 are provided at the rear of the present portable work station.

It is, in the figures, to be noted that prior to unfolding of the above described work platforms, the present portable work station exhibits all external appearances of a conventional single axle U-haul trailer. Accordingly, its transportation upon roads and highways will not give rise to any questions with respect to the motor vehicle laws.

Further, it is of course to be appreciated that other folding arrangements may be presented within the scope and intent of the present inventive disclosure.

Accordingly, it is seen that the desired object of providing a portable cutting and sewing work station capable of providing all essential sewing, cutting and mending functions as may have otherwise be provided at an in-house, manufacturer's installation has been attained by the invention of the above description.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

We claim:

1. A portable cutting and sewing work station comprising a trailer comprising a base and a plurality of vertical walls, said trailer adapted to be towed by a motor vehicle, a sewing machine supported on said trailer, a recessed work seat proximately disposed adjacent to said sewing machine, said work seat supported by said trailer whereby a portion thereof is integral with one of said vertical walls, and a collapsibly foldable rolled fabric storage and dispensing area located behind said work seat.

2. The work station as recited in claim 1 in which said trailer comprises a single-axle trailer.

3. The work station as recited in claim 1 in which said station further comprises peripherally associated work areas, said work areas being proximately disposed to said sewing machine.

* * * * *